May 5, 1942.    C. LYNN    2,282,196
PARALLEL OPERATION OF DYNAMO-ELECTRIC MACHINES
Filed Feb. 20, 1940
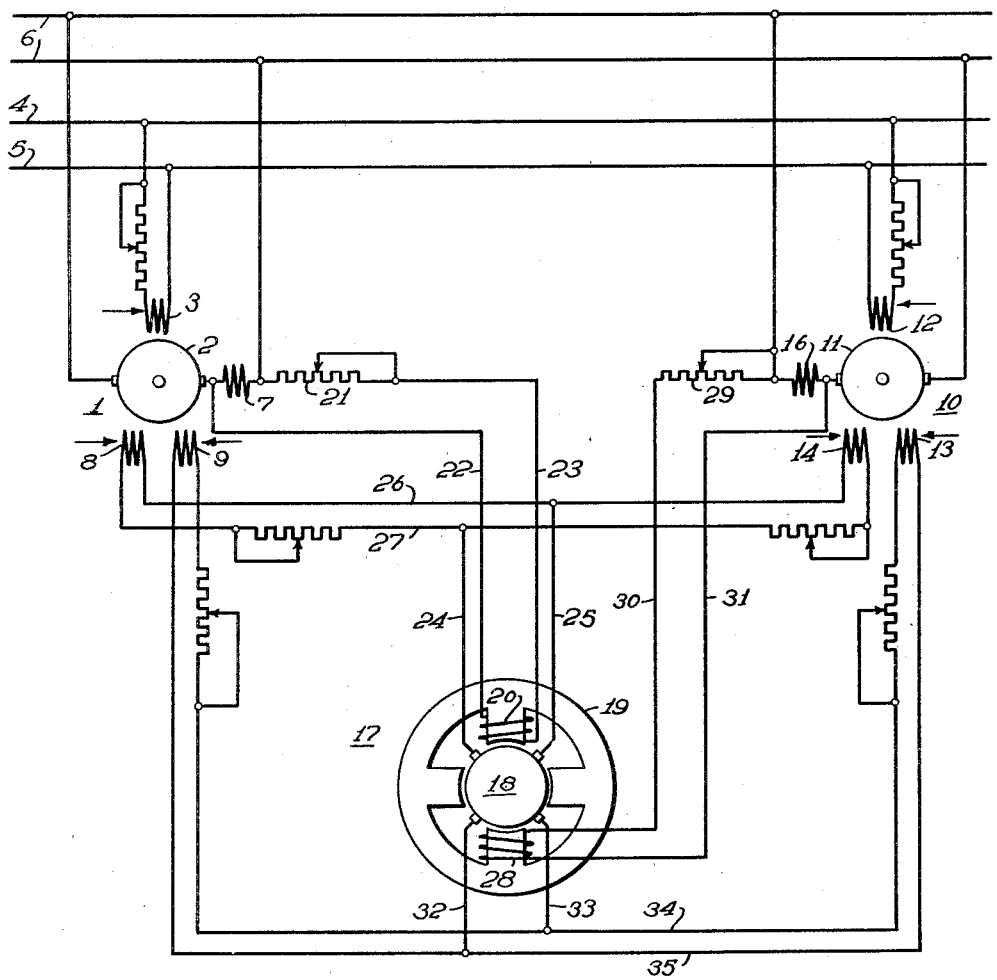
WITNESSES:
INVENTOR
Clarence Lynn.
BY
ATTORNEY Patented May 5, 1942

2,282,196

UNITED STATES PATENT OFFICE 2,282,196

PARALLEL OPERATION OF DYNAMO-ELECTRIC MACHINES

Clarence Lynn, Wilkinsburg, Pa., assignor to Westinghouse Electric & Manufacturing Company, East Pittsburgh, Pa., a corporation of Pennsylvania Application February 20, 1940, Serial No. 319,861

8 Claims. (Cl. 171—224)

My invention relates, generally, to parallel operation of dynamo-electric machines and it has particular reference to the control of the excitation of a plurality of dynamo electric machines of the compound direct current type operating in parallel as generators or motors to supply a common load.

Heretofore, it has been the usual practice to operate dynamo-electric machines, of the compound direct current type in parallel, either as motors or generators, and utilize a series exciter with each machine which is so connected as to produce an excitation voltage proportional to the load on its associated machine for energizing the cumulative and differential compounding field winding of the machines to maintain a predetermined load division in a well known manner. This requires the use of as many series exciters as there are machines which not only complicates the system to some extent but also increases the cost.

The object of my invention generally stated, is to provide a control system for the operation of a plurality of compound dynamo electric machines in parallel, in which a single multiple circuit series exciter is utilized to supply current for energizing the compounding field windings of all of the machines, thereby effecting a considerable saving in equipment and a reduction in the floor space required for installation.

A more specific object of my invention is to provide a control system for the operation of a pair of direct-current compound motors in parallel to drive a common load in which a double circuit exciter having a lap-wound armature without equalizer connections and a pair of field circuits connected respectively in circuit relation with the armatures of the two motors is utilized to energize the cumulative and differential compounding field windings of the motors.

Another object of my invention is to provide a control system for energizing the compounding field windings of a plurality of compound wound direct current machines from a single, multiple circuit exciter, each of the plurality of potentials obtained therefrom being proportional respectively, to the load currents of the several machines.

These and other objects of my invention will become more apparent from the following detailed description and from the drawing, the single figure of which is a schematic diagram illustrating a preferred embodiment of my invention as applied to a pair of compound direct current motors connected in parallel to drive a common load between them.

Referring now to the drawing, a compound motor 1 is provided with an armature 2 and a main shunt field winding 3 which may be connected for excitation from any suitable source of potential, as indicated by conductors 4 and 5. The motor 1 may be energized from any suitable source of power such as indicated by the conductors 6 which are usually connected to a variable voltage generator (not shown). The armature 2 of the motor is connected to the source of power 6 in series with the commutating field winding 7 as shown.

For compounding purposes, the motor 1 is provided with a cumulative compounding field winding 8 and a differential compounding field winding 9. The flux produced by these two compounding field windings functions to vary the total field flux in the machine by increasing or opposing the flux produced by the main shunt field winding and their effect on the operation of the motor 1 will be explained in detail hereinafter.

Another compound motor 10, similar to motor 1, includes an armature 11, a main shunt field winding 12, a cumulative field winding 13 and a differential field winding 14. The armature 11 of this motor is also connected to the source 6 through the commutating field winding 16, as shown.

The armatures 2 and 11, respectively, of the motors 1 and 10 may be mechanically coupled in any well known manner to drive a common load between them.

In accordance with my invention, I have provided a double circuit exciter generator 17 having an armature element 18 and a four pole field element 19 to supply the current for energizing the field windings 8, 9, 13 and 14 of the meters 1 and 10 respectively. In order that a pair of separate and distinct potentials may be produced by the generator 17, I prefer to utilize a lap winding on the armature 18 thereof without equalizer connections between the various coils of the lap winding. The characteristics and construction of the lap winding is well known and it is not considered necessary to include such details herein.

In order to produce an output potential on one of the armature circuits of generator 17 which will be proportional to the armature or load current of the motor 1, I have provided for connecting the field winding 20 of the generator 17 in series with a variable resistor 21 across the commutating field winding 7 of the motor 1 by means of conductors 22 and 23, although it will be understood that any other convenient method of energizing the field winding 20 of the generator 17 in proportion to the armature or load current of the motor 1, may be employed, such as, for example, the use of the potential drop obtained across a suitable shunt placed in series with the armature circuit of the motor 1.

Any suitable means may be utilized to drive the generator 17 at a substantially constant speed and hence the generator output potential on conductors 24 and 25 will be proportional to the amount of current flowing in the field winding 20 of the generator 17. Conductors 24 and 25 are connected to the cumulative field winding 8 of the motor 1 and also to the differential field winding 14 of motor 10 by means of conductors 26 and 27.

Similarly, the field winding 28 of the generator 17 is connected in series with a variable resistor 29 across the commutating field winding 16 of motor 10 through conductors 30 and 31 and the generator output potential across conductors 32 and 33 is connected to the cumulative field winding 13 of the motor 10 and to the differential field winding 9 of the motor 1 by means of conductors 34 and 35.

The operation of the system shown is as follows: Should the motor 1 have a tendency to increase its speed, which would obviously cause the motor 1 to take more than its share of the total common load to which the motors 1 and 10 are connected in parallel, the resultant increase of current in the armature circuit of the motor 1 will cause an increase in the potential applied to the field winding 20 of the generator 17 which will, likewise, increase the generator output potential on conductors 24 and 25.

Accordingly, the current and hence the flux produced in the cumulative field winding 8 of the motor 1 will be increased. The flux in the winding 8 adds to the flux produced by the main shunt field winding 3 and the resultant increase in the total flux in the field system of the motor 1 will thereby function to counteract the tendency of motor 1 to gain speed and restore the motor to its proper operating speed.

At the same time, the increase in flux in the differential field winding 14 of the motor 10 which opposes the flux in the shunt field winding 12 is effective to lower the total field flux in the motor 10 and hence will tend to increase the speed of its armature element 11, thereby expediting the restoration of motors 1 and 10 to their normal operating speed at which the load being supplied is properly divided between them.

On the other hand, should the current through the armature circuit of the motor 10 be increased, thereby causing the armature 11 thereof to increase its speed and take more than its share of the total load, the current in field winding 28 of the generator 17 will likewise be increased, causing an increase in the potential which is applied to the cumulative field winding 13 of the motor 10 and the differential field winding 9 of the motor 1. Such an increase in the excitation of the cumulative field winding 13 of the motor 10 and a corresponding increase in the excitation of differential winding, winding 9 of motor 1 will likewise function to restore the motors 1 and 10 to their normal speed at which the load is divided properly between them.

It will be evident that my invention is equally applicable to compound motors operating in parallel where such motors have only cumulative fields, the differential field windings being eliminated.

While I have illustrated but one embodiment of my invention, i. e., the use of a double circuit exciter generator to supply the series field windings of two compound motors operating in parallel to drive a common load between them, it will be apparent that my invention is equally applicable to other types of load applications requiring more than two compound motors or to applications requiring a plurality of generators. For example the mechanical coupling between the armatures 2 and 11 of the motors 1 and 10 respectively may be eliminated and the motors connected separately to drive individual loads in which case either the cumulative or differential field windings may be used depending upon the type of compounding required for the particular loading.

It will also be evident that the number of circuits in the generator 17 can be increased to accommodate any number of motors or generators utilized by increasing the number of field poles in the field structure 19 of the generator 17, two such poles being required for each motor utilized. Accordingly, were three such compound motors employed in a particular application, the field structure 19 of my exciter generator 17 would comprise six poles, every other such pole including a winding thereon connected in circuit relation with the respective motor armature circuits.

It will also be obvious that other types of multi circuit exciters may be utilized equally as well as the one described and that still other changes may be made in the embodiment which has been illustrated and described without departing from the spirit and scope of my invention. I desire therefore that only such limitations be placed upon the appended claims as are required by the prior art.

I claim as my invention:

1. In combination, a plurality of dynamo-electric machines connected in parallel, each of said machines being provided with main shunt field windings and cumulative and differential compounding field windings, and a single multiple circuit exciter for controlling the division of load between said machines, said exciter being disposed to control the relative degrees of excitation of the compounding field windings of the machines in accordance with their respective load currents.

2. In combination a plurality of dynamo-electric machines connected in parallel circuit relation, each of said machines having a separately excited shunt field winding and cumulative and differential compounding field windings, and a single exciter for energizing the cumulative and differential compounding field winding of all the machines, said exciter having a plurality of field circuits each of which is connected to be energized in accordance with the load currents of one of said machines and a plurality of armature circuits each of which is connected to energize the cumulative field winding of one machine and the differential field winding of another machine, thereby to cause said machines to divide the total load in a predetermined ratio.

3. In combination, a plurality of dynamo-electric machines connected in parallel, each of said machines having a main shunt field winding and at least one compounding field winding, and a multi-circuit exciter for energizing the respective compounding field windings of each of said machines, said exciter having an armature with a lap-wound winding thereon without equalizer connections, and a multi-polar field structure including a pair of poles for each of said armature circuits and a field winding on every other pole thereof connected in circuit relation with the respective armature circuits of said machines for energization therefrom in proportion to the load currents of the armature circuits of said machines, and means connecting the armature circuits of the exciter to the compounding field windings of each of said machines, thereby to control the relative degrees of excitation of the machines in accordance with the loads thereof.

4. In combination, a plurality of direct-current motors connected in parallel circuit relation to a source and also connected to drive a common load, each of said motors having a main shunt field winding and a cumulative and a differential compounding field winding, and a single multiple-circuit exciter for said motors, said exciter having a plurality of field windings each being connected to be energized in accordance with the load current of its associated motor and a plurality of pairs of armature terminals each of which is connected to a cumulative field winding on one motor and a differential field winding on another motor, whereby said motors are caused to divide their common load in a predetermined ratio.

5. In combination, a pair of compound motors, connected in parallel to drive a common load, a main shunt field winding for each of said motors, means for exciting said main shunt field windings, cumulative and differential field windings for each of said motors, and a single exciter for energizing said cumulative and differential field windings in proportion to the armature current of said motors, said exciter comprising an armature having thereon a lap wound circuit without equalizer connections and a four pole field system, one of said field poles having a winding thereon energized in proportion to the current flowing in the armature circuit of said first motor, an oppositely disposed field pole having a winding thereon energized in proportion to the current flowing in the armature circuit of said second motor, means for tapping the armature circuit of said exciter to obtain a potential proportional to the flux produced by said first field pole winding for energizing the cumulative field winding of said first motor and the differential field winding of said second motor, and means for tapping the armature circuit of said exciter to obtain a potential proportional to the flux produced by said oppositely disposed exciter field pole winding for energizing the cumulative field winding of said second motor and the differential field winding of said first motor.

6. In combination, first and second compound motors, each of said motors having a main shunt field winding and cumulative and differential compounding field windings, and a multiple circuit exciter for energizing the compounding field windings of both of said motors, said exciter being provided with a plurality of armature circuits; means for deriving an output potential from one of said exciter armature circuits proportional to the load current of the first motor and means for impressing said potential on the cumulative field winding of the first motor and also upon the differential field winding of the second motor; means for deriving an output potential from another of said exciter armature circuits proportional to the armature load current of the second motor and means for impressing said potential on the cumulative field winding of the second motor and also upon the differential field winding of the first motor.

7. In combination, first and second dynamo electric machines, each of said machines having a main shunt field winding and cumulative and differential compounding field windings, and a multi-circuit exciter for energizing all of said compounding field windings, means providing a pair of electrically distinct field and armature circuits within said exciter, means for energizing one of said exciter fields in proportion to the armature current of the first machine, and means for connecting the corresponding exciter armature circuit to energize the cumulative field winding of the first machine and the differential field winding of the second machine, means for energizing the other of said exciter fields in proportion to the armature current of the second machine and means for connecting the corresponding exciter armature circuit to energize the cumulative field winding of the second machine and the differential field of the first machine.

8. In combination, a plurality of compound motors connected to drive a common load, each of said motors including a main shunt field winding and cumulative and differential compounding field windings, and a single multiple-circuit exciter generator for energizing the compounding field windings of each of said motors, said exciter generator having an armature provided with a lap-wound winding thereon without equalizer connections to provide independent armature circuits and a multipolar field system having a pair of field poles for each of said independent armature circuits and a pair of terminals for each armature circuit, a field winding on every other field pole thereof connected in circuit relation with the respective armature circuits of said compound motors for energization therefrom in proportion to the current flowing in said motor armature circuits, means connecting each pair of armature terminals to the cumulative compounding field winding of the motor to which the associated field winding is connected and to the differential compounding field winding of at least one of the other motors, whereby said motors are caused to divide their common load in a predetermined ratio.

CLARENCE LYNN.